United States Patent
Stanford

(10) Patent No.: US 7,544,902 B2
(45) Date of Patent: Jun. 9, 2009

(54) MECHANICAL LIFT MEASUREMENT SYSTEM

(75) Inventor: Frantz D. Stanford, Madison, WI (US)

(73) Assignee: Actuant Corporation, Glendale, WI (US)

( * ) Notice: Subject to any disclaimer, the term of this patent is extended or adjusted under 35 U.S.C. 154(b) by 317 days.

(21) Appl. No.: 10/549,716

(22) PCT Filed: Mar. 26, 2004

(86) PCT No.: PCT/US2004/009436

§ 371 (c)(1),
(2), (4) Date: Jun. 26, 2006

(87) PCT Pub. No.: WO2004/088134

PCT Pub. Date: Oct. 14, 2004

(65) Prior Publication Data

US 2007/0034420 A1 Feb. 15, 2007

Related U.S. Application Data

(60) Provisional application No. 60/458,987, filed on Mar. 28, 2003.

(51) Int. Cl.
*G01G 19/00* (2006.01)
*G01G 23/20* (2006.01)
*G01C 5/04* (2006.01)

(52) U.S. Cl. .................... 177/146; 177/173; 116/205; 116/283; 116/334; 187/394; 254/1; 254/89 H; 33/333; 33/367; 33/832

(58) Field of Classification Search ............... 116/334, 116/205, 283; 187/394; 254/1, 89 R, 90–92, 254/89 H; 177/145, 146, 173; 33/333, 365, 33/367, 832, 833
See application file for complete search history.

(56) References Cited

U.S. PATENT DOCUMENTS 444,077 A * 1/1891 Thompson et al. .......... 116/283
(Continued)

FOREIGN PATENT DOCUMENTS

DE 889362 9/1953

OTHER PUBLICATIONS

Supplementary European Search Report dated Mar. 12, 2007.
(Continued)

*Primary Examiner*—Randy W Gibson
(74) *Attorney, Agent, or Firm*—Quarles & Brady LLP

(57) ABSTRACT

A lift measurement system is provided for determining a position of a load during a lift operation. The system includes a display that includes a scale and encloses a movable indicator that moves relative to the scale. A linkage is in communication with the load and the scale, such that movement of the load is translated to movement of the indicator relative to the scale to provide an indication of the position of the load. A plurality of displays and linkages may be installed at various load support zones such that the relative position of the corresponding indicators provides feedback related to the orientation of the load.

14 Claims, 6 Drawing Sheets

U.S. PATENT DOCUMENTS

| | | | |
|---|---|---|---|
| 2,971,264 A | | 2/1961 | Cowan |
| 3,126,069 A | * | 3/1964 | Shepley ..................... 177/136 |
| 4,098,221 A | * | 7/1978 | Mickelson et al. .......... 116/205 |
| 4,169,320 A | | 10/1979 | Bennett ....................... 33/367 |
| 4,625,424 A | | 12/1986 | de la Haye ................... 33/367 |
| 4,686,773 A | | 8/1987 | Brewer ........................ 33/367 |
| 4,894,924 A | | 1/1990 | Nakanishi et al. |
| 4,903,946 A | | 2/1990 | Stark ........................... 254/45 |
| 5,890,721 A | * | 4/1999 | Schneider et al. ........ 280/6.153 |
| 6,904,698 B2 | * | 6/2005 | Halliar et al. ................. 33/833 |

OTHER PUBLICATIONS

International Search Report, Form PCT/ISA/210, as issued by United States Patent and Trademark Office in Connection with PCT Application No. PCT/US04/009436.

Written Opinion of the International Searching Authority under date of Nov. 18, 2004 as issued in connection with PCT Application No. PCT/US04/009436.

* cited by examiner

MECHANICAL LIFT MEASUREMENT SYSTEM

CROSS-REFERENCE TO RELATED APPLICATIONS

This claims the benefit of the filing date of U.S. Provisional Patent Application Ser. No. 60/458,987, filed Mar. 28, 2003, the disclosure of which is hereby incorporated by reference as if set forth in its entirety herein.

STATEMENT REGARDING FEDERALLY SPONSORED RESEARCH OR DEVELOPMENT

BACKGROUND OF THE INVENTION

The present invention relates generally to mechanical lift systems, and in particular, relates to a method and apparatus for measuring the orientation of a load during and after mechanical lift operations.

Conventional lifting systems include a plurality of hydraulic actuators having cylinders and movable pistons acting under high fluid pressure that support the underside of a load. In some cases, for example when the load is bulky, heavy, or has an uneven weight distribution, the user must take special care to eliminate the risk of the load sliding off its supports. In these cases, it is desirable to implement a system that provides a measurement of an actual load orientation. The operator can thus compare the measured orientation to a desired load orientation (e.g., level with respect to the horizontal plane). If it is determined that the load is not level, certain hydraulic actuators may be selectively adjusted until the measured load orientation substantially equals the desired load orientation.

Conventional devices measure a load orientation using a computerized system having a plurality of sensors that are mounted at select locations on the load that send electronic feedback to a centralized processor. The processor monitors the relative position of each sensor and determines whether the load is properly oriented. Alternatively, the sensors may be placed directly on the actuators to measure the amount of piston displacement. The measured load orientation is fed through an electronic communications system and output to a user display. The user can then choose to raise or lower certain cylinders to achieve the desired load orientation. Some computerized systems have the capability to accept a desired orientation as input by the user, and constantly monitor and automatically adjust the position of those cylinders necessary to achieve the desired orientation.

While such systems possess considerable capability and ease of operation, they are expensive and complex to implement, especially when installing the computerized system from one load to the next.

What is therefore needed is a simplified and cost-effective method and apparatus for measuring a load orientation that can be easily integrated into a mechanical lift operation.

BRIEF SUMMARY OF THE INVENTION

In accordance with one aspect of the invention, a lift measurement system is provided for determining a position of a load during a lift operation. The lift operation can be of the type including a stationary cylinder and an associated piston that is extendable and retractable with respect to the cylinder at a load support zone of the load to correspondingly raise and lower the load. The lift measurement system includes a display having a scale and enclosing an indicator that is movable with respect to the scale. A linkage is operatively coupled at one end to the load support zone, and connected at a second end to the display. The linkage responds to load movement at the load support zone by moving the indicator relative to the scale.

These and other aspects of the invention are not intended to define the scope of the invention for which purpose claims are provided. In the following description, reference is made to the accompanying drawings, which form a part hereof, and in which there is shown by way of illustration, and not limitation, a preferred embodiment of the invention. Such embodiment also does not define the scope of the invention, and reference must therefore be made to the claims for this purpose.

BRIEF DESCRIPTION OF THE DRAWINGS

Reference is hereby made to the drawings in which like reference numerals correspond to like elements throughout, and in which.

DETAILED DESCRIPTION OF THE PREFERRED EMBODIMENT

Figure 1:
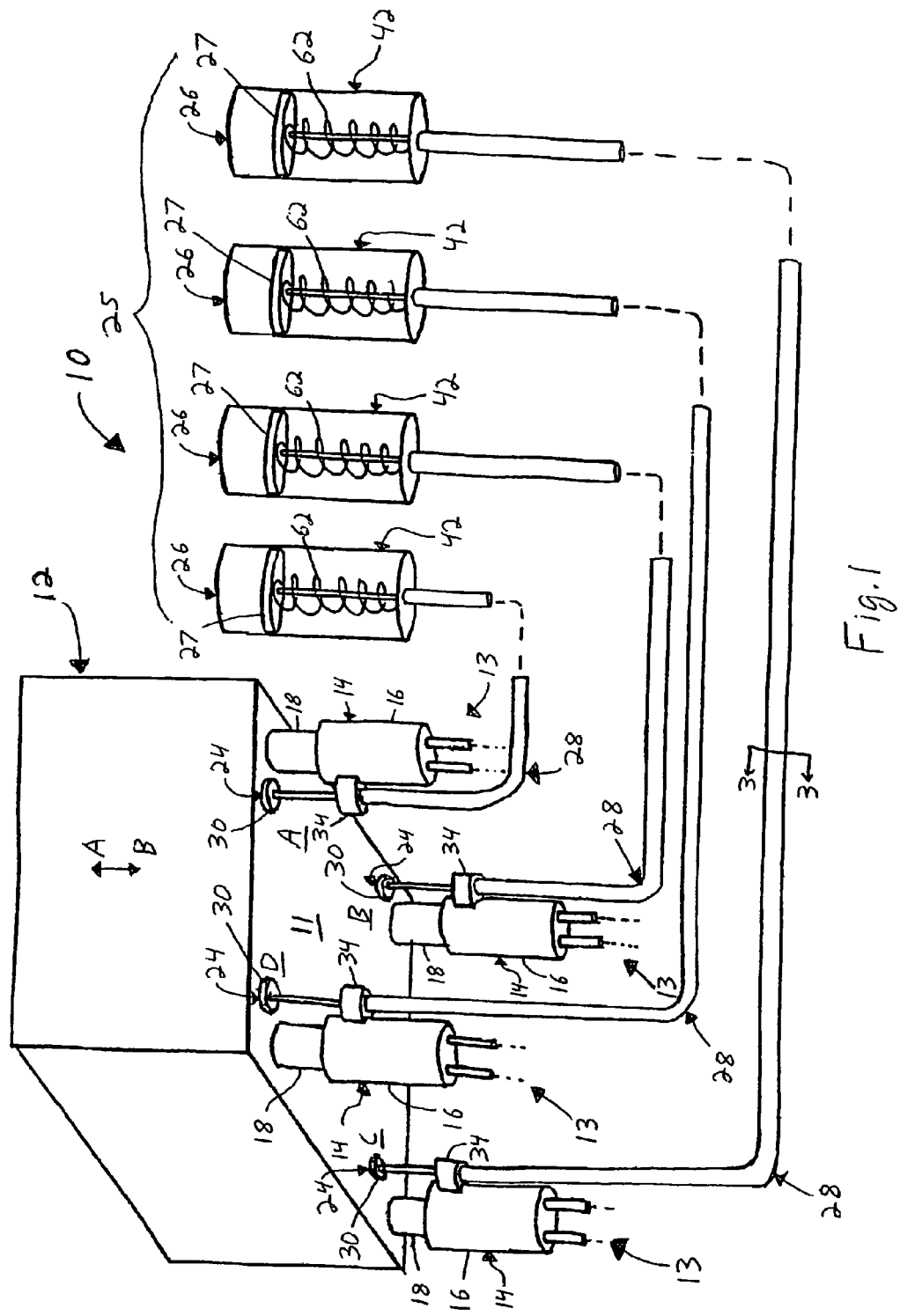
FIG. 1 is a schematic perspective view of a support system including a mechanical lift mechanism supporting a load whose orientation is measured by a mechanical lift measurement system constructed in accordance with a preferred embodiment of the invention.
Figure 2:
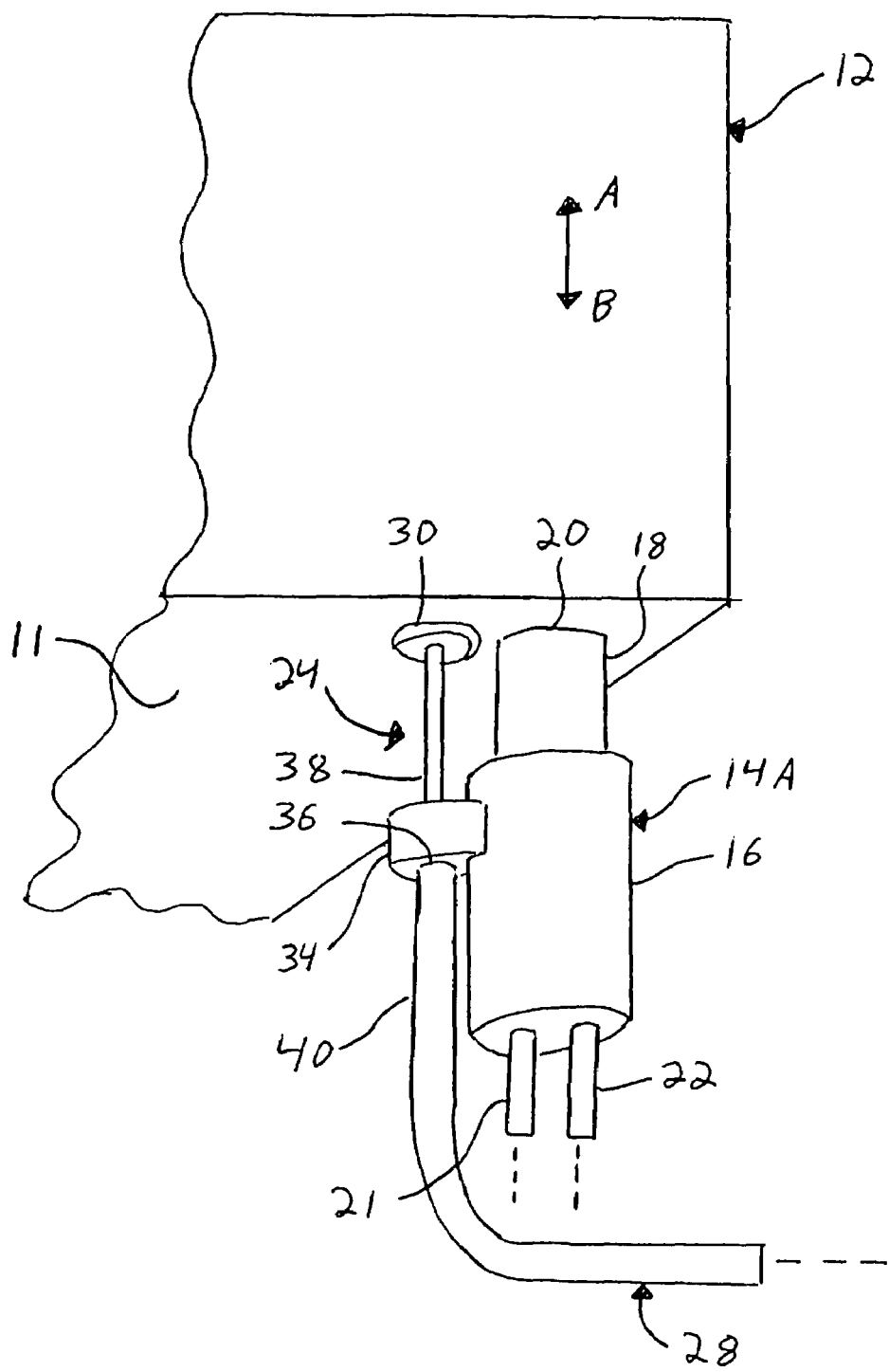
FIG. 2 is an exploded partial perspective view of the support system illustrated in FIG. 1.

Referring to FIGS. 1 and 2, a load support system 8 includes a mechanical lift mechanism 13 supporting the undersurface 11 of a load 12 at four load support zones (i.e., quadrants A-D), corresponding to the four corners of the undersurface 11. Support system 8 further includes a mechanical lift measurement system 10 for measuring the orientation of the load 12 whose position is controlled using lift mechanism 13. In particular, load 12 is supported and lifted by a plurality of hydraulic actuators 14 at each support zone, each actuator having a corresponding cylinder 16, and a movable piston 18. Each piston 18 defines an upper support surface 20 that engages the undersurface 11.

Actuators 14 can be controlled simultaneously using a single valve, orifice, or switch, or alternatively using individual dedicated valves, orifices, or switches in accordance with the preferred embodiment. While four such hydraulic actuators 14 support load 12 as illustrated in FIG. 1, the present invention anticipates that any number of actuators 14 can be used to support a given load 12.

When load 12 is to be raised, a switch (not shown) is actuated by the user to activate a pump (not shown) that causes hydraulic fluid to flow from a tank (not shown) to control valves (not shown) that can be operated to control the cylinders 16 via supply lines 21. The hydraulic pressure acts on the undersurface (not shown) of pistons 18 and causes the pistons 18 to rise with respect to the corresponding cylinders 16. Conversely, when load 12 is to be lowered, fluid flows from cylinders 16 to the tank through the control valves via return lines 22, which causes the pistons 18 to retract under gravitational forces.

As illustrated, undersurface 11 is flat and rectangular, and extends in a horizontal plane when load 12 is in its desired orientation. It should be appreciated, however, that the lift mechanism 13 of FIG. 1 is a simplified set up which is provided for illustrative purposes, and that the present invention could be applied to many and varied lifting applications, such as houses, other buildings, bridges, and other structures having any size and shape that can achieve a desired orientation using the principles of the present invention. The term "desired orientation," while horizontal as illustrated, should be broadly construed to include any orientation that achieves load stability during lifting operations.

For instance, one will appreciate that loads having an irregularly shaped undersurface 11 will not achieve a desired orientation when upper surfaces 20 of pistons 18 are positioned in the same horizontal plane. Rather, the desired orientation will depend factors such as the contour of undersurface 11 and the weight distribution of load 12. Furthermore, while quadrants A-D correspond with the four corners of the rectangular undersurface 11 in accordance with the preferred embodiment, actuators 14 can be positioned at any load support zone so long as load 12 is stable when supported by pistons 18. Lift measurement system 10 advantageously provides a method and apparatus for examining the position of pistons 18 at predetermined locations across the undersurface 11 of load 12, and determining what adjustments should be made to improve load stability.

In accordance with the preferred embodiment, mechanical lift measurement system 10 includes a plurality of linkages 24, each connected between a given load support zone and a display 26. Each display 26 includes an indicator 27 that can be read by an operator to determine the position of the piston 18 at the corresponding load support zone.

As illustrated in FIGS. 1 and 2, linkage 24 includes a cable assembly 28 that is anchored to undersurface 11 via a mounting plate 30 whose upper surface is connected to undersurface 11 at the desired load support zone using any known suitable fastening technique, for example adhesive, screws, nails, and the like. A bracket 34 is fixed to the outer surface of an associated cylinder 16 using any suitable fastening technique, and extends outwardly therefrom. Bracket 34 defines a vertically extending cylindrical bore 36 that is in vertical alignment with mounting plate 30. Bracket 34 thus remains stationary as piston 18 extends and retracts during operation.

Figure 3:
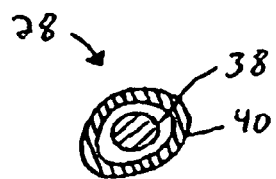
FIG. 3 is a sectional elevation view of a cable assembly taken along line 3-3 of FIG. 1.

Referring also to FIG. 3, cable assembly 28 includes a flexible tubular metal cable member 38 that is connected to mounting plate 30 at a proximal, or load, end. Cable member 38 extends through bore 36, and is connected to indicator 27 inside display 26 at a distal, or display, end. A tubular flexible plastic or rubber-covered wound metal outer sleeve or cable sheath 40 is connected between bracket 34 and display 26, and surrounds the portion of cable 38 extending between bracket 34 and display 26. Sleeve 40 is incompressible and inextensible axially, and the steel cable 38 is also inextensible and incompressible, and is supported against buckling by sleeve 40. Bore 36 may be threaded so as to be attached to a threaded end of the sleeve 40, or there may be a press fit or any other suitable connection between the end of the sleeve 40 and the bracket 34 to prevent relative axial movement therebetween. Alternatively, the proximal end of sleeve 40 can be mounted anywhere such that its position is fixed relative to cylinder 16, and the contained cable 38 is movable along with load 12.

During operation, cable 38 moves relative to sleeve 40 in response to movement of load 12. Cable assembly 28 may be of the type commonly used for aircraft controls, which is a heavy duty version of the type of cable/sleeve conventionally used for bicycle brakes and gear shifting cables.

Figure 4:
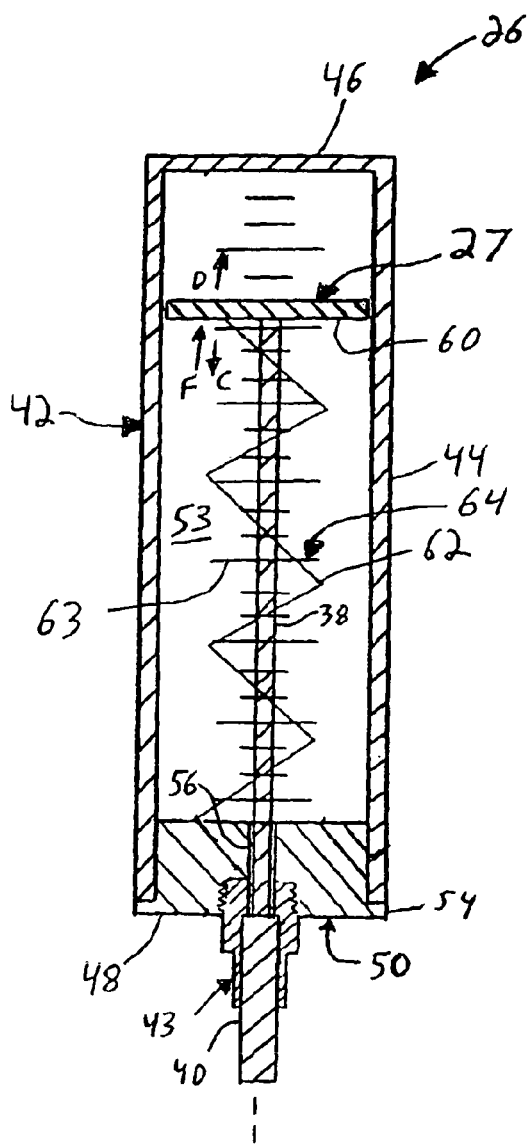
FIG. 4 is a sectional side elevation view of a display illustrated in FIG. 1.

Referring now to FIGS. 1 and 4, displays 26 are located remote from the corresponding linkages 24 at a distance that depends, at least in part, on the length of the corresponding cable assemblies 28. Preferably, displays 26 are located near each other in a display zone 25 to facilitate ease of operation, and may be placed in proximity to the valves that control the cylinder that the particular cable and display is associated with.

Each display 26 includes a transparent graduated cylinder 42, preferably formed from Plexiglas, that presents a transparent outer radial wall 44 that is closed at its upper end by an integral upper end wall 46. Cylinder 42 is closed at its lower end by a cylindrical plug 50 that can either be press fit or threadedly inserted into cylinder 42. Radial wall 44, upper end wall 46, and plug 50 define an internal measuring chamber 53 that houses indicator 27. A flange 54 extends radially out from the lower end 48 of plug 50, and provides a stop when plug 50 is fully inserted into cylinder 42. A cylindrical bore 56 extends vertically through plug, and has a diameter slightly greater than the diameter of cable member 38.

The distal end of sleeve 40 is connected to the lower end 48 of plug 50, and is aligned with bore 56. Preferably, sleeve 40 is connected to plug 50 via a threaded ferrule 43 that is crimped onto the end of the sleeve 40 (sleeve 40 may be similarly mounted to bracket 34). Alternatively, sleeve 40 can be connected to plug 50 (or bracket 34) via a press fit or other suitable connection, and could alternatively be mounted to any suitable structure such that its position is fixed with respect to indicator 27.

Cable member 38 extends upwardly from sleeve 40 at the distal end, through bore 56, and is connected to the lower surface 60 of indicator 27 which is in the form of a cylindrical disk that extends horizontally within cylinder 42. Indicator disk 27 has a diameter slightly less than the inner diameter of radial wall 44 which guides the disk as it travels up and down within the cylinder 42. A coil spring 62 extends up from the upper surface of plug 50 inside cylinder 42, and surrounds cable member 38. The upper end of spring 62 is connected to the lower surface of indicator 27 and provides a vertical force F that biases indicator 27 upwards to prevent cable 38 from buckling inside the display 26 and preferably to maintain tension in the cable 38 from end to end, so the cable also does not buckle between plate 30 and bracket 34 if the load is lowered. It should thus be appreciated that spring 62 can be removed if cable member 38 is sufficiently strong to prevent buckling during operation.

During operation, when load 12 is raised along the direction of Arrow A, the proximal end of cable member 38 is extended relative to the proximal end of outer sleeve 40. Accordingly, the distal, or indicator, end of cable member 38 is lowered in the direction of Arrow C relative to the distal end of sleeve 40. Indicator 27 is thus lowered relative to cylinder 42 a distance equal to the distance that the corresponding load support zone has been raised. Conversely, when load 12 is lowered along the direction of Arrow B, the distal end of cable member 38 is raised along the direction of Arrow D, thereby also raising indicator 27 relative to cylinder 42. The upward movement of indicator 27 corresponds to the distance that quadrant A of load 12 is lowered. Spring force F also biases indicator 27 upwardly to remove any potential slack in cable member 38.

Measurement markings 63 are formed in, or printed on, radial wall 44, and are aligned with the lower surface, upper surface, or other predetermined marked location of indicator 27. Markings 63 thus provide a scale 64 whose output depends on the position of piston 18 at the corresponding load support zone.

Each display 26 is thus labeled to enable the user to readily measure the actual load position at each load support zone. The position of each load support zone, in turn, provides an indication of the actual orientation of the load 12. If the actual load orientation does not equal the desired load orientation, select pistons 18 can be raised and lowered as needed to achieve the desired load orientation. For example, as illustrated, if an indicator 27 of a first display 26 is higher than the indicators 27 of the other displays 26, the user will determine that the load quadrant corresponding to the first indicator 27 should be raised in order to achieve the desired horizontal orientation. If, on the other hand, the indicator 27 of the first display is lower than the indicator 27 of the remaining displays 26, the user will determine that load quadrant corresponding to the first indicator should be lowered in order to achieve the desired orientation.

While the position of indicators 27 of certain displays 26 is examined relative to indicators 27 of the other displays 26 to determine the orientation of load 12 in accordance with the preferred embodiment, it should be appreciated that the scale markings 63 may also provide an actual measurement of the vertical position of load 12 at the given quadrants. Such a measurement will enable a user to determine whether actuators 14 should be raised or lowered to achieve a desired load height.

Figure 5:
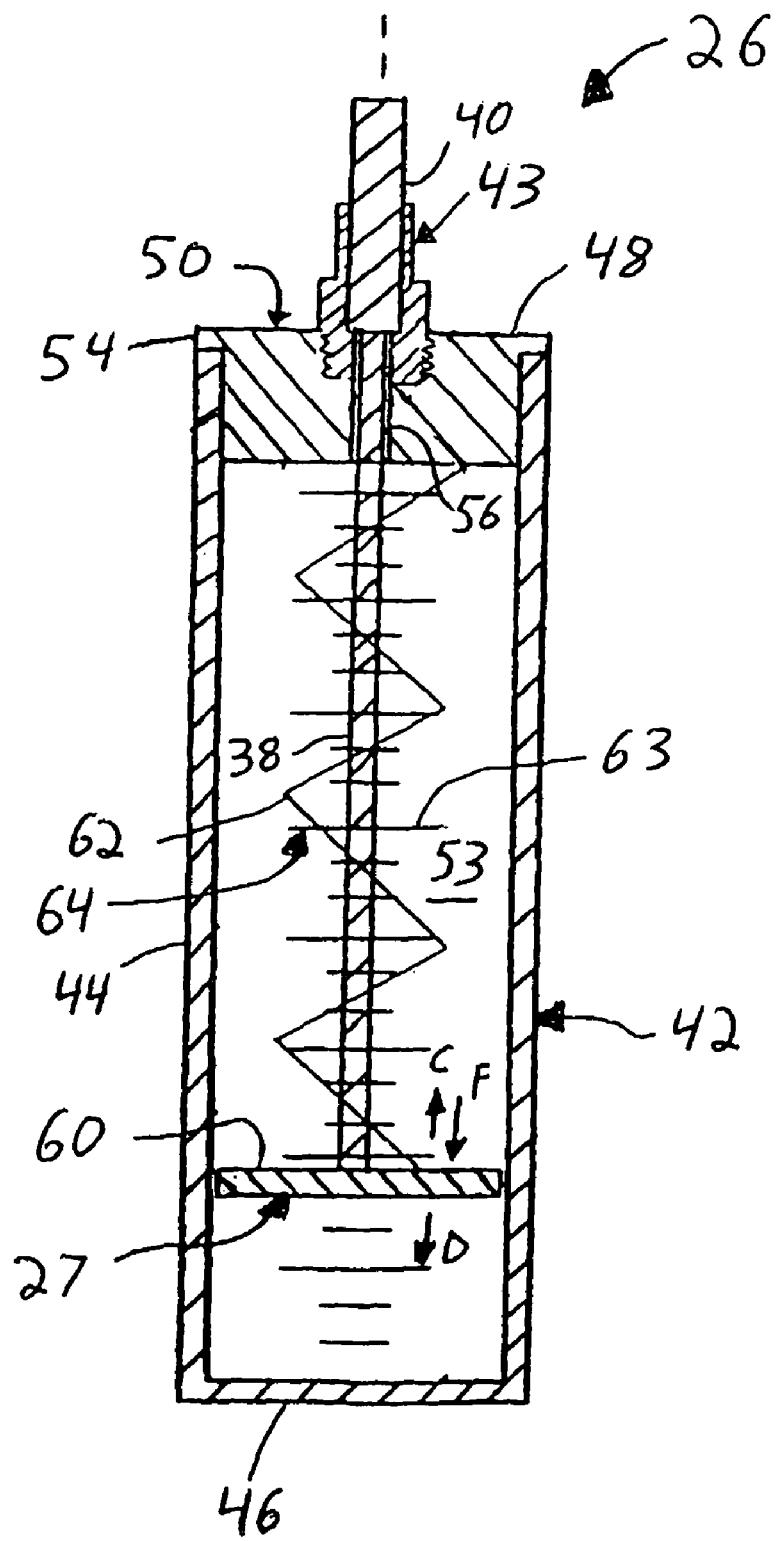
FIG. 5 is a sectional side elevation view of the display constructed in accordance with an alternate embodiment.

Referring to FIG. 5, an alternate embodiment of the invention enables the indicator 27 to translate in the same direction as load 12 such that, as load 12 raises and lowers in the direction of Arrows A and B, indicator will correspondingly raise and lower within cylinder 53 in the direction of Arrows C and D, respectively. As illustrated, sleeve 40 is connected to plug 50 in the manner described above. However, plug 50 closes the upper end of the cylinder, and end wall 46 closes the lower end. In this embodiment, while spring 62 is not necessary to prevent buckling of cable member 38, it may still be desirable to prevent cable member 38 from bending, crimping, or otherwise deforming in a manner that would affect the position of indicator 27.

Once the lifting operation has been completed, lift measurement system 10 can be easily uninstalled from load 12 by removing mounting plates 30 from undersurface 11, and can be easily installed onto another load by attaching mounting plates 30 onto the undersurface of another load at predetermined locations that will enable the operator to determined the orientation of load 12. If desired, measurement system 10 can also be removable from lift mechanism 13 by removing each bracket 34 from its corresponding actuator 14. Advantageously, measurement system 10 uses no processors, electronic communications devices, or other costly electronic components, and is easy to install.

In accordance with an alternate embodiment, measurement system 10 can be simplified by avoiding the requirement that mounting plates 30 be fastened directly to the undersurface 11 of load 12. Rather, mounting plates 30 are biased into contact with undersurface 11. Accordingly, linkage 24, and the associated components of linkage 24, are said to be "operatively coupled" to load 12, meaning that the linkage can either be directly mounted to, or otherwise operatively engage, load 12 at a desired load support zone.

In particular, spring 62 can be configured to bias indicator 27 downwardly, causing cable member 38 to travel towards load 12 which, in turn, pushes mounting plate 30 against the undersurface 11. This embodiment would be desirable in situations where mounting plates 30 may not be easily fastened to, and subsequently removed from, load 12. Of course, cable member 38 would need to be sufficiently stiff to prevent buckling under the force of spring 62 particularly at the ends where it extends beyond and is not supported by the sleeve 40.

Figure 6:
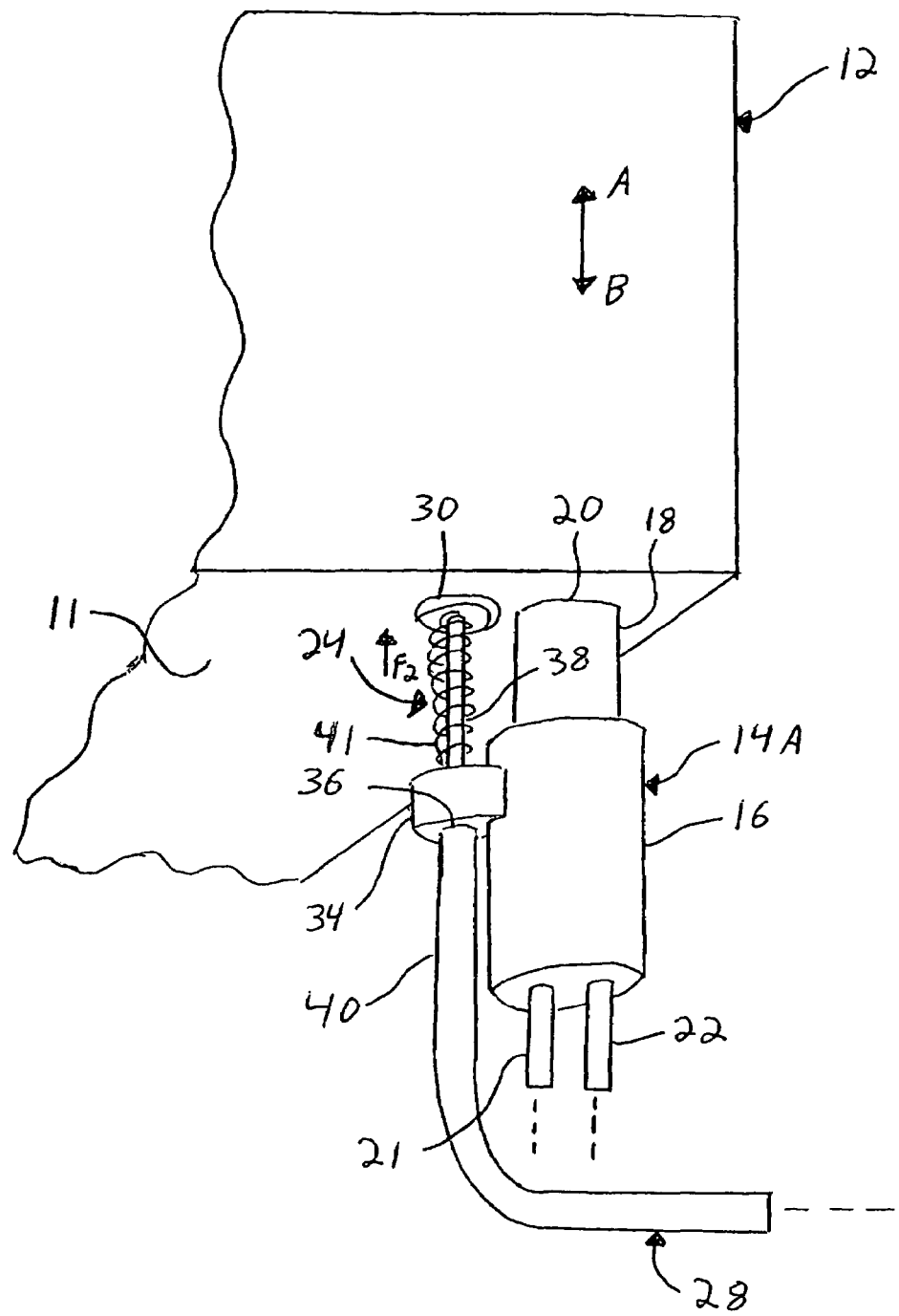
FIG. 6 is an exploded partial perspective view similar to FIG. 2, but with the lift measurement system constructed in accordance with an alternate embodiment.

Alternatively, as illustrated in FIG. 6, an additional spring 41 can be provided that extends between bracket 34 and mounting plate 30, and surrounds cable member 38. Spring 41 can be provided with or without spring 62 to provide a net vertical force in the direction of Arrow F2 that biases mounting plate up and against undersurface 11. If spring 41 is provided along with spring 62, spring force F2 will be greater than upwards spring force F in order to ensure that contact between mounting plate 30 and undersurface 11 is maintained, while at the same time enabling spring 62 to prevent cable member 38 from buckling inside chamber 53.

The cable assemblies 28 can be assembled to the actuators 14 so that in a given position of the piston 18 relative to the cylinder 16 for each actuator, the position of the indicator 27 will be the same in each associated display 26. That way, for example at the beginning of a lift, all displays 26 can start out at the same reading. In addition, it is preferred that the position of the sleeve 40 be adjustable relative to the bracket 34 and/or the display 26, for example, by turning ferrule 43 (or a corresponding part at the bracket 34 end) to vary the position and thereby make fine adjustments to the position of the indicator 27 relative to the display 26.

Figure 7:
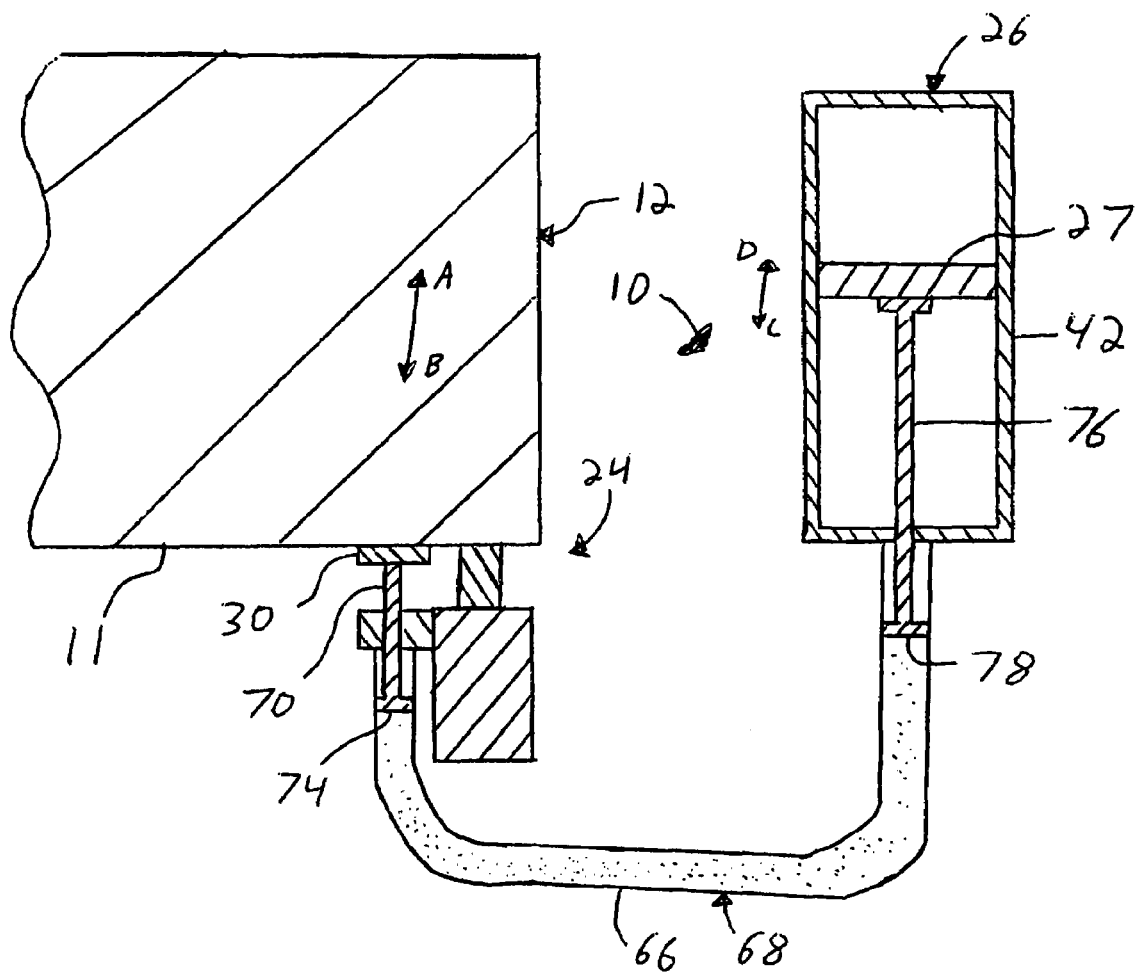
FIG. 7 is a sectional side elevation view of the lift measurement system including a hydraulic linkage constructed in accordance with an alternate embodiment.

Furthermore, while the linkage 24 includes a cable assembly 28 that is connected between load 12 and display 26 in accordance with the preferred embodiment, it should be appreciated that the present invention is not limited to alternative linkages for transferring load displacement to a display in a manner that can be detected by an operator. For instance, referring to FIG. 7, linkage 24 can include a hydraulic motion transfer system as opposed to cable assembly 28.

Such a hydraulic system includes a hose 66 or other conduit filled with a fluid 68, such as a hydraulic fluid, between the first, load end piston 70 and a second, display end piston 76. First piston 70 extends out from the proximal, or load, end of conduit 66 and terminates at a mounting surface 72 that engages undersurface 11. Piston 70 can be directly fastened to load 12, or can engage load under a spring force, such as provided by spring 41 described above. Piston 70 includes a piston head 74 at its lower end that forms a seal inside conduit 66 with respect to hydraulic fluid 68 or forms a sliding seal with the wall of a cylinder that is in fluid-communication with the conduit 66. Second piston 76 extends out from the distal, or display end, of conduit 66 or from a cylinder in communication therewith, and terminates at indicator 27. Piston 76 can either be directly connected to indicator 27, or alternatively can be biased into contact with indicator 27 under the downward forces of a spring similar to spring 62 illustrated in FIG. 5. Piston 76 includes a piston head 78 at its lower end that forms a seal inside conduit 66 with respect to hydraulic fluid 68, or inside a cylinder that is in communication with the conduit 66.

During operation, as load 12 is lowered, first piston head 74 pushes hydraulic fluid 68 against second piston head 78, which raises indicator 27 relative to scale 64 in the direction of Arrow D. Conversely, as load 12 is raised, first piston head 74 pulls hydraulic fluid 68, creating a vacuum in conduit 66 which causes second piston 76 and indicator 27 to lower with respect to scale 64 in the direction of Arrow C. Alternatively, display 26 could be configured in the orientation illustrated in FIG. 5 such that the indicator 27 is raised and lowered in tandem with load 12.

Thus the invention transfers motion of the load being lifted to an indicator in a display by movement of a medium, i.e., a cable or hydraulic fluid, in a conduit, i.e., a cable sheath or hydraulic hose, to remotely provide an indication of the movement of the load to the lift operator. A cable system has advantages in simplicity, cost, maintenance, weight, manageability, and adjustability although other systems such as hydraulic may also be viable.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

I claim:

1. A lift measurement system for determining a position of a load during a lift operation including a stationary cylinder and an associated piston that is extendable and retractable with respect to the cylinder at a load support zone of the load to correspondingly raise and lower the load, the system comprising:
    a display including a scale and enclosing an indicator that is movable with respect to the scale; and
    a linkage operatively coupled at one end to the load support zone, and connected at a second end to the display, wherein the linkage transfers movement of the load at the load support zone to the indicator to move the indicator relative to the scale;
    wherein the linkage comprises a cable assembly having a proximal end attached to the load and a distal end attached to the indicator;
    wherein the cable assembly further comprises a cable member connected between the load and the indicator;
    wherein the cable member is surrounded by a stationary sleeve;
    wherein the stationary sleeve is connected at one end to the cylinder, and at a second end to the display; and
    wherein the stationary sleeve is connected to the cylinder via a bracket attached to the cylinder.

2. The lift measurement system as recited in claim 1, wherein the linkage is attached to an upper end of the indicator.

3. The lift measurement system as recited in claim 1, wherein the linkage is attached to a lower end of the indicator.

4. The lift measurement system as recited in claim 1, wherein the display further comprises a cylinder having a closed end connected to one end of a spring, and wherein the spring is connected at a second end to the indicator.

5. The lift measurement system as recited in claim 1, wherein the linkage is fastened to the load at the load support zone.

6. The lift measurement system as recited in claim 1, wherein the linkage further comprises a plate that engages the load at the load support zone under forces from a spring.

7. The lift measurement system as recited in claim 1, further comprising a plurality of linkages coupled to a corresponding plurality of load support zones, wherein each linkage is coupled to one of a corresponding plurality of displays.

8. The lift measurement system as recited in claim 7, wherein the plurality of displays provide an indication of a load orientation.

9. A support system for performing lift operations on a load and determining a load orientation, the load support system comprising:
    first and second lifting systems that support the load at a corresponding first and second load support zone, each lifting system including a cylinder and corresponding piston that is extendable and retractable relative to the respective cylinder;
    first and second displays linked to the corresponding first and second lifting systems, wherein each display includes a scale and encloses an indicator that is movable with respect to the scale; and
    first and second linkages connected between the first and second load support zones, respectively, and the first and second displays, respectively, wherein each linkage transfers movement of the corresponding load support zone by movement of a medium through a conduit to move the corresponding indicator relative to the scale;
    wherein each indicator can be read relative to the corresponding scale to determine the load orientation; and
    wherein each linkage comprises a cable assembly having a proximal end coupled to the corresponding load support zone, and a distal end connected to the corresponding indicator.

10. The support system as recited in claim 9, wherein each display provides an output of an actual load position.

11. The support system as recited in claim 9, wherein each display further comprises a cylinder having a closed end connected to one end of a spring, and wherein the spring is connected at a second end to the corresponding indicator.

12. The support system as recited in claim 9, wherein each linkage further comprises a plate that engages the load at the corresponding load support zone under forces from a spring.

13. A support system for performing lift operations on a load and determining a load orientation, the load support system comprising:
    first and second lifting systems that support the load at a corresponding first and second load support zone, each lifting system including a cylinder and corresponding piston that is extendable and retractable relative to the respective cylinder;
    first and second displays linked to the corresponding first and second lifting systems, wherein each display includes a scale and encloses an indicator that is movable with respect to the scale; and
    first and second linkages connected between the first and second load support zones, respectively, and the first and second displays, respectively, wherein each linkage transfers movement of the corresponding load support zone by movement of a medium through a conduit to move the corresponding indicator relative to the scale;
    wherein each indicator can be read relative to the corresponding scale to determine the load orientation; and
    wherein each linkage comprises a cable assembly having a proximal end coupled to the corresponding load support zone, and a distal end connected to the corresponding indicator.

14. A support system for performing lift operations on a load and determining a load orientation, the load support system comprising:
    first and second lifting systems that support the load at a corresponding first and second load support zone, each lifting system including a cylinder and corresponding piston that is extendable and retractable relative to the respective cylinder;

first and second displays linked to the corresponding first and second lifting systems, wherein each display includes a scale and encloses an indicator that is movable with respect to the scale; and first and second linkages connected between the first and second load support zones, respectively, and the first and second displays, respectively, wherein each linkage transfers movement of the corresponding load support zone by movement of a medium through a conduit to move the corresponding indicator relative to the scale, wherein each indicator can be read relative to the corresponding scale to determine the load orientation; and wherein each linkage further comprises a plate that engages the load at the corresponding load support zone under forces from a spring.

* * * * *